United States Patent
Kakutani

(10) Patent No.: US 8,567,892 B2
(45) Date of Patent: Oct. 29, 2013

(54) PRINTING DEVICE, PRINTING METHOD, AND PRINT DATA CREATION PROGRAM

(75) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 13/037,793

(22) Filed: Mar. 1, 2011

(65) Prior Publication Data

US 2011/0242174 A1 Oct. 6, 2011

(30) Foreign Application Priority Data

Apr. 6, 2010 (JP) .................................. 2010-087666

(51) Int. Cl.
*B41J 2/205* (2006.01)
(52) U.S. Cl.
USPC .......................................................... 347/15
(58) Field of Classification Search
None
See application file for complete search history.

(56) References Cited

U.S. PATENT DOCUMENTS

2008/0123147 A1  5/2008  Koase et al.
2010/0026746 A1*  2/2010  Fujita et al. ..................... 347/12

FOREIGN PATENT DOCUMENTS

JP          05136994 A  *  6/1993
JP       2008-130003 A     6/2008

* cited by examiner

*Primary Examiner* — Stephen Meier
*Assistant Examiner* — Tracey McMillion
(74) *Attorney, Agent, or Firm* — Global IP Counselors, LLP

(57) ABSTRACT

A printing device for discharging ink from a print head to print an image includes a detection unit configured to detect pixels of at least a high-concentration side of an edge of the image as edge pixels based on image data including plurality of pixels, a halftone processing unit configured to create dot data expressing whether or not dots are formed based on the image data, and a printing unit configured to print the image by combining together dots formed at multiple different timings in a common print region of a print medium. The halftone processing unit is configured to create the dot data so that dots are formed disproportionately towards one of the multiple timings in positions on the print medium where dots corresponding to the edge pixels are formed.

10 Claims, 13 Drawing Sheets

PRINTING DEVICE, PRINTING METHOD, AND PRINT DATA CREATION PROGRAM

CROSS-REFERENCE TO RELATED APPLICATIONS

This application claims priority to Japanese Patent Application No. 2010-087666 filed on Apr. 6, 2010. The entire disclosure of Japanese Patent Application No. 2010-087666 is hereby incorporated herein by reference.

BACKGROUND

1. Technical Field

The present invention relates to a printing technology for performing printing by discharging ink from a print head onto a print medium.

2. Related Art

In a serial inkjet printer, printing is performed by discharging ink from a plurality of nozzles and forming dots on a print medium while moving a print head comprising the nozzles in a primary scanning direction and a secondary scanning direction relative to the print medium. In such inkjet printers, positional deviation sometimes occurs in which the positions where the ink discharged from the nozzles of the print head are deposited on the print medium deviate from their target positions. For example, when the ink discharge timing of the forward and backward movement of the print head is not strictly constant, the relative positional relationship between the dot group formed by the forward movement of the print head and the dot group formed by the backward movement will have deviated from the target positions. In other cases, when ink of a certain amount or more is discharged onto the print medium, the expanding/contracting and undulating (so-called cockling) of the paper causes the distance between the print head and the print medium to differ between forward and backward movement, and as a result, the dots are formed deviated from their target positions.

When such positional deviation occurs, the edges of letters or lines sometimes blur, which is a cause of reduced print quality. Such problems are not limited to serial inkjet printers, and have been common to printing devices which output printed images formed by discharging ink with multiple different timings to form dots in a common print region of the print medium and combining these dots formed at multiple different timings with each other. For example, in line printers as well, wherein a plurality of print heads are arrayed in a zigzag formation across the entire width direction of the print medium and some adjacent print heads are made to overlap each other, the same problems have occurred because of the difference in the discharge timings of ink from the print heads arranged in a zigzag formation. See, for example, Japanese Laid-Open Patent Publication No. 2008-130003.

SUMMARY

Based on at least some of the problems described above, an object to be achieved by the present invention is to suppress the blurring of edges in printed images that occurs along with dot positional deviation resulting from differences in ink discharge timing.

The present invention was devised in view of the object described above, and can be actualized in the following embodiments and aspects.

A printing device according to a first aspect is a printing device for discharging ink from a print head onto a print medium to print an image. The printing device includes an input unit, a detection unit, a halftone processing unit and a printing unit. The input unit is configured to input image data constituting the image. The detection unit is configured to detect pixels constituting at least a high-concentration side of an edge of the image as edge pixels based on the inputted image data. The halftone processing unit is configured to create dot data expressing whether or not dots are formed based on the image data. The printing unit is configured to print the image by combining together dots formed at multiple different timings in a common print region of the print medium based on the dot data. The halftone processing unit is configured to create the dot data so that, in positions on the print medium where dots corresponding to the edge pixels are formed, the dots are formed disproportionately toward one of the multiple different timings.

In the printing device of this configuration, edge pixels are detected, and dots are formed disproportionately towards any of the multiple timings at which dots are formed in the common print region of the print medium in dot formation positions corresponding to the edge pixels. Therefore, it is possible to suppress dot positional deviation that results from differences in the multiple timings. As a result, blurring of the edges in the printed image can be suppressed. The term "based on the image data" includes configurations that use the inputted image data as is, as well as configurations that use image data obtained by performing a predetermined process on the inputted image data.

In the printing device as described above, the halftone processing unit is preferably configured to create the dot data so that dots are formed disproportionately toward a relatively earlier timing with which the ink is discharged into the common print region from among the multiple different timings.

In the printing device of this configuration, dots are formed in dot formation positions corresponding to the edge pixels, the dots being formed disproportionately toward the timing with which the ink is relatively first discharged into the common print region from among the multiple timings. Specifically, is a large amount of ink is discharged in a state in which ink has not been discharged into the common print region, it is possible to suppress the occurrence of positional deviation due to cockling. As a result, blurring of the edges in the printed image can be suppressed.

In the printing device as described above, the halftone processing unit is preferably configured to create the dot data by a dither method in which presence or absence of dots is established using a dither mask including multiple thresholds. The dither mask is preferably created so that each of the dot groups formed with each of the multiple different timings and an overall dot group combining the dot groups have blue noise characteristics or green noise characteristics.

With the printing device of this configuration, since dot data is generated using a dither mask created so that any of the dot groups formed with each of the multiple timings and the overall dot group combining these dot groups have blue noise characteristics or green noise characteristics, even if dots are formed disproportionately towards any of the multiple timings, a satisfactory dispersion of dots can be ensured through the entire printed image, and the graininess of the printed image can be prevented from worsening.

In the printing device as described above, in the halftone processing unit, the process for forming dots disproportionately is preferably inhibited in cases in which the image data of the edge pixels is of a lower tone than a predetermined value.

With the printing device of this configuration, since the process for forming dots disproportionately is inhibited in low-tone print regions, the speed of the process for creating dot data can be increased. Moreover, since the edges of the printed image are not easily visible in low-tone print regions, there is no large reduction of print quality due to blurring of the edges. Specifically, it is possible to both increase the speed of the process and ensure print quality.

In the printing device as described above, the printing unit is preferably capable of forming dots in two or more sizes, the printing device preferably further comprises a density data establishing unit configured to establish density data respectively for the dots of the two or more sizes based on the inputted image data, the density data expressing the density with which the dots are to be formed, the halftone processing unit is preferably configured to create dot data based on the established density data, the dot data expressing whether or not the respective dots of the two or more sizes are formed, and the density data establishing unit is preferably configured to establish the density data so that the density data of relatively small-sized dots among the dots of the two or more sizes in the edge pixels is smaller than the density data in the pixels that are not edge pixels.

With the printing device of this configuration, density data is established so that the density data of relatively small-sized dots among the dots of the two or more sizes in the edge pixels is smaller than the density data in the pixels that are not edge pixels. Since small-sized dots use a relatively small amount of ink, a relatively large number of dots are formed in order to express the tone of the inputted image data. Therefore, the degree of freedom in the process for forming dots disproportionately tends to be limited with the small-sized dots. For example, when the density data exceeds the maximum obtainable density data value divided by the number of multiple timings, it will no longer be possible to form dots disproportionately with only one of the multiple timings. When the density data reaches the maximum obtainable density data value, it is not possible to perform the process for forming dots disproportionately. According to the configuration of the present applied example, such limits do not readily take effect, and it can be made easier to perform the process for forming dots disproportionately.

In the printing device as described above, the printing unit is preferably capable of forming dots in two or more sizes, the printing device preferably further comprises a density data establishing unit configured to establish density data respectively for the dots of the two or more sizes based on the inputted image data, the density data expressing the density with which the dots are to be formed, the halftone processing unit is preferably configured to create dot data based on the established density data, the dot data expressing whether or not the respective dots of the two or more sizes are formed, and the halftone processing unit is preferably configured to create dot data for forming dots disproportionately with one of the multiple timings for only dots among the two or more sizes that are of a size relatively characterized in that the relative positions between dots formed at multiple different timings readily deviate from the target positions.

With the printing device of this configuration, since the process for forming dots disproportionately is performed only for dots that are of a size relatively characterized in that the relative positions between dots formed at multiple timings readily deviate from the target positions, the speed of the process for creating dot data can be increased above that of cases in which the process is performed for dots of all sizes. Moreover, since the process for forming dots disproportionately is performed for dots of a size relatively characterized in that deviation from the target positions is likely, the effect of suppressing blurring in the edges of the printed image can be achieved efficiently. Specifically, it is possible to both increase the speed of the process and ensure print quality.

In the printing device as described above, the printing unit is preferably configured to perform printing while moving the print head relative to the print medium in a primary scanning direction and a secondary scanning direction, the multiple different timings preferably include a forward-movement timing with which the print head moves relatively one way in the primary scanning direction and a backward-movement timing with which the print head moves relatively the opposite way in the same direction.

With the printing device of this configuration, dot positional deviation resulting from differences between forward and backward movement can be suppressed, and edge images can be printed. Since the differences between forward and backward movement are the primary cause of positional deviation, blurring of the edges of the printed image can be satisfactorily suppressed.

In the printing device as described above, the halftone processing unit is preferably configured to create the dot data so that dots are formed disproportionately towards one timing of either forward-movement or backward-movement for high-concentration edge pixels detected the Nth time (N is an integer of 1 or higher) in the image data of one line in the primary scanning direction, and the halftone processing unit is preferably configured to create the dot data so that dots are formed disproportionately towards the other timing of either forward-movement or backward-movement for the high-concentration edge pixels detected the N+1 time in the image data of one line in the primary scanning direction.

With the printing device of this configuration, since the dots constituting the edges at both ends of lines and letters in the primary scanning direction can be formed in different primary scannings, the widths of the letters or lines in the primary scanning direction can be increased or reduced according to the direction of the positional deviation when there is positional deviation between the forward movement and backward movement. Therefore, if primary scanning, which causes the formation of dots to be disproportionate, is set according to the characteristics of positional deviation in the printing device so that the widths of the letters and lines in the primary scanning direction decrease, the widths of the letters and lines can be reduced and sharper letters and lines can be printed.

In addition to the printing device as described above, the present invention can also be embodied as a printing method, a print data creation program, a storage medium on which this program is recorded, and other embodiments.

A printing method according to another aspect of the present invention is a printing method for printing an image by combining together dots formed by a print head at multiple different timings in a common print region of a print medium. The printing method includes: inputting image data constituting the image; detecting pixels constituting at least a high-concentration side of an edge of the image as edge pixels based on the image data; creating dot data expressing whether or not dots are formed based on the image data so that dots are formed disproportionately towards one of the multiple different timings in positions on the print medium where dots corresponding to the edge pixels are formed; and printing the image based on the dot data.

According to another aspect, a non-transitory computer readable medium is provided that has stored thereon a print data creation program which is executable by a computer to create print data for printing an image with a printing device by combining together dots formed by a print head at multiple different timings in a common print region of a print medium.

The print data creation program controls the computer to execute function of: inputting image data constituting the image; detecting pixels constituting at least a high-concentration side of an edge of the image as edge pixels based on the image data; and performing halftone processing by creating dot data expressing whether or not dots are formed based on the image data so that dots are formed disproportionately towards one of the multiple different timings in positions on the print medium where dots corresponding to the edge pixels are formed.

BRIEF DESCRIPTION OF THE DRAWINGS

Referring now to the attached drawings which form a part of this original disclosure.

DETAILED DESCRIPTION OF EXEMPLARY EMBODIMENTS

A. First Embodiment

The first embodiment of the present invention is described.

A-1. Device Configuration

Figure 1:
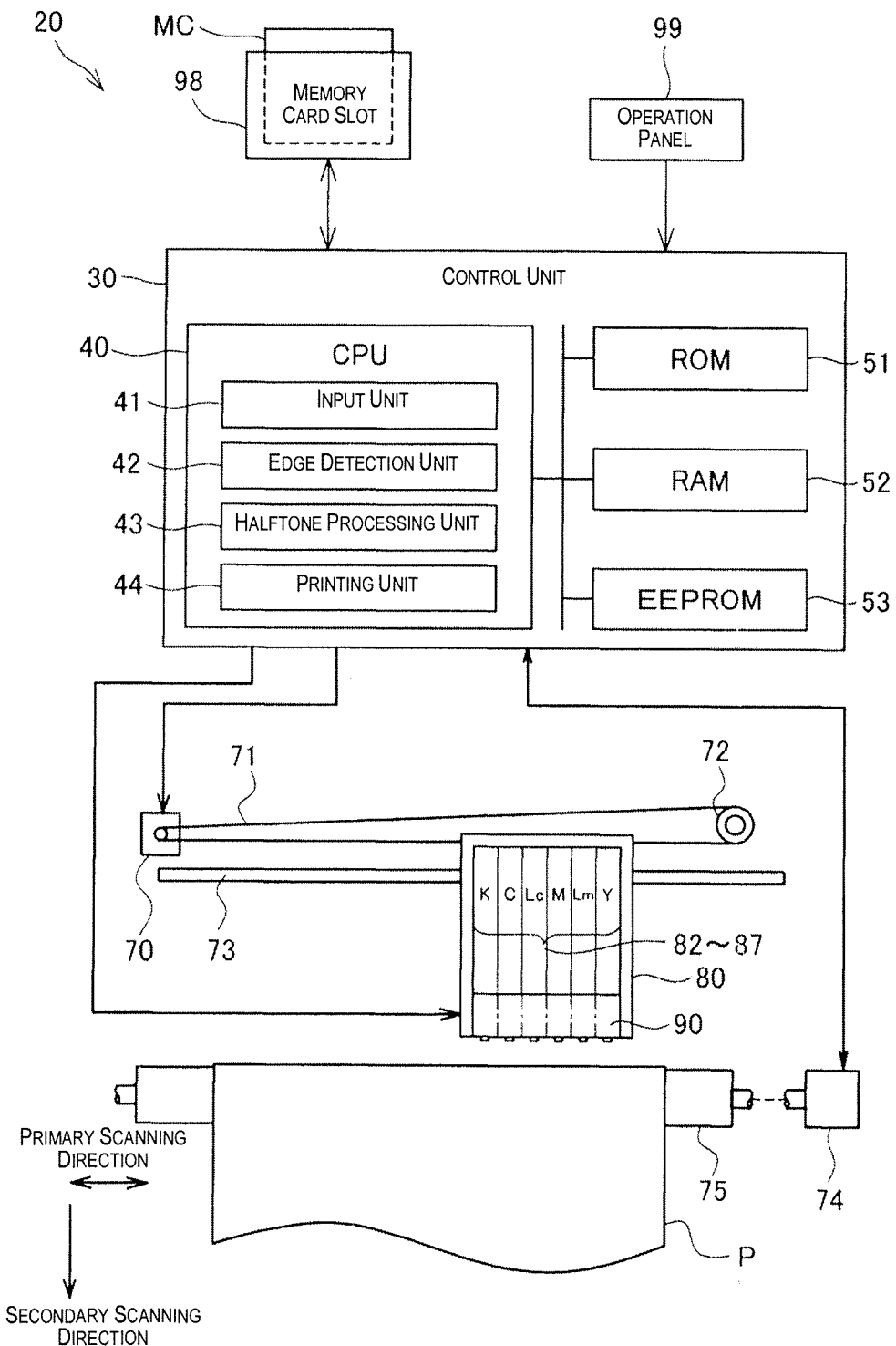
FIG. 1 is a schematic configuration diagram of a printer 20 as a first embodiment of the present invention.

FIG. 1 is a schematic configuration diagram of a printer 20 as a first embodiment of the present invention. The printer 20 is a serial inkjet printer which perform printing in two directions, and the printer 20 is configured from a mechanism for conveying a print medium P by a paper-feeding motor 74, a mechanism for moving a carriage 80 back and forth in an axial direction of a platen 75 by a carriage motor 70, a mechanism for driving a print head 90 mounted on the carriage 80 to discharge ink and form dots, a control unit 30 which enables the exchange of signals between the paper-feeding motor 74, the carriage motor 70, the print head 90, and an operation panel 99, as shown in the diagram.

The mechanism for moving the carriage 80 back and forth in the axial direction of the platen 75 is configured from a sliding shaft 73 which is erected parallel to the axis of the platen 75 and which slidably holds the carriage 80, a pulley 72 which supports an endless drive belt 71 together with the carriage motor 70, and other components.

Mounted on the carriage 80 are ink cartridges 82 to 87 for color ink, which respectively store cyan ink (C), magenta ink (M), yellow ink (Y), black ink (K), light cyan ink (Lc), and light magenta ink (Lm) as color inks. Nozzle rows corresponding to the color inks of the colors described above are formed on the print head 90 in the bottom of the carriage 80. When these ink cartridges 82 to 87 are mounted on the carriage 80, ink can be supplied from the cartridges to the print head 90.

The control unit 30 is configured with a CPU 40, a ROM 51, a RAM 52, and an EEPROM 53 connected to each other through a bus. In addition to controlling the overall actions of the printer 20 by opening and running the programs stored in the ROM 51 and EEPROM 53 in the RAM 52, the control unit 30 also functions as an input unit 41, and edge detection unit 42, a halftone processing unit 43, and a printing unit 44. The details of these functional units are described hereinafter.

A dither mask is stored in the EEPROM 53. The dither mask is used in a dot-dispersing halftone process that uses systematic dithering, and is configured with a plurality of thresholds stored respectively in each of a same number of storage elements.

A memory card slot 98 is connected to the control unit 30, and image data ORG can be read and inputted to the control unit 30 from a memory card MC inserted into the memory card slot 98. In the present embodiment, the image data ORG inputted from the memory card MC is data composed of the three color components red (R), green (G), and blue (B).

The printer 20 having the hardware configuration described above moves the print head 90 back and forth in the primary scanning direction relative to the print medium P by driving the carriage motor 70, and moves the print medium P in the secondary scanning direction by driving the paper-feeding motor 74. The control unit 30 drives the nozzles at appropriate timings based on the print data in accordance with the back and forth movement (primary scanning) of the carriage 80 and the paper-feeding movement (secondary scanning) of the print medium, whereby ink dots of the appropriate colors are formed in the appropriate positions on the print medium P. This makes it possible for the printer 20 to print color images inputted from the memory card MC on the print medium P.

A-2. Printing Process

Figure 2:
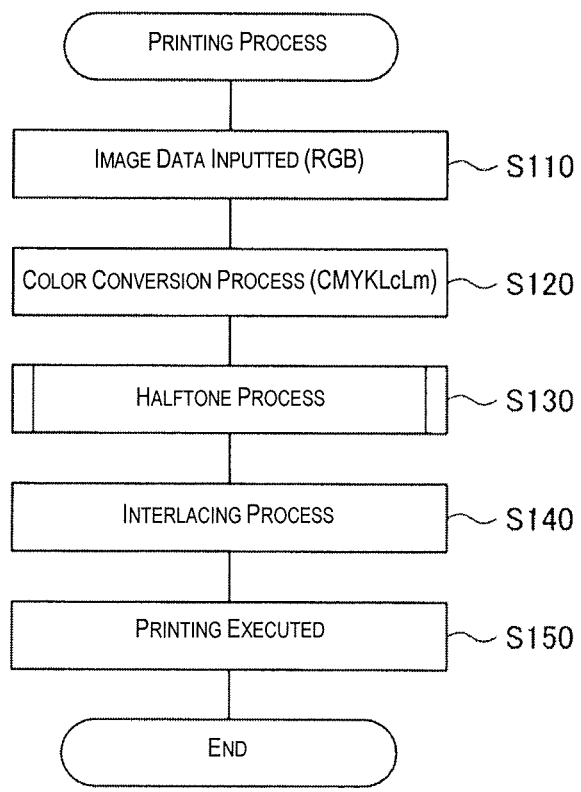
FIG. 2 is a flowchart showing the flow of the printing process in the printer 20.

The printing process in the printer 20 will be described. FIG. 2 is a flowchart showing the flow of the printing process in the printer 20. The printing process herein is initiated by using the operation panel 99 or the like to perform a print command operation for a predetermined image stored in the memory card MC. When the printing process is initiated, the CPU 40 first reads and inputs image data ORG in RGB format, which is the objective of printing, from the memory card MC via the memory card slot 98, and this action is a process of the input unit 41 (step S110).

When the image data ORG is inputted, the CPU 40 refers to a lookup table (not shown) stored in the EEPROM 53 and color-converts the RGB format of the image data ORG to a CMYKLcLm format (step S120).

When the color conversion process is performed, the CPU 40 performs, as a process of the halftone processing unit 43, a halftone process for converting the image data to ON/OFF data for the dots of the different colors (step S130). This process is performed using systematic dithering in the present embodiment. Specifically, the input data is compared with the threshold stored in the storage element at the position corresponding to the input data from among the plurality of thresholds constituting the dither mask, and if the input data is greater than the threshold, the result is determined as dot ON, whereas if the input data is less than the threshold, the result is determined as dot OFF. The dither mask used in this process is repeatedly applied in the primary scanning direction and the secondary scanning direction relative to the respective pieces of input data aligned in the primary scanning direction and the secondary scanning direction. The details of this halftone process are described hereinafter. The halftone process is not limited to an ON/OFF binary process of the dots, and may be a multivalue process of ON/OFF for large dots and small dots, or the like. The image data provided in step S130 may be subjected to a resolution conversion process, a smoothing process, or another form of image processing.

When the halftone process is performed, the CPU 40 performs an interlacing process (step S140) for switching to a sequence of dot pattern data printed in one primary scanning unit, the process being performed according to the nozzle arrangement, paper-feeding rate, and other characteristics of the printer 20. When the interlacing process is performed, the CPU 40 drives the print head 90, the carriage motor 70, the motor 74, and other components to execute printing as a process of the printing unit 44 (step S150).

The design of dot formation in this printing process is described hereinbelow using FIG. 3. The print head 90 in the present embodiment has 10 nozzles Nz for each ink color. These nozzles Nz are aligned in rows in the secondary scanning direction at intervals equivalent to one nozzle.

The printed image is created in the following manner while the print head 90 performs primary scanning and secondary scanning. In the following description, a single primary scanning is referred to as a pass, and the scannings are denoted by a pass number and referred to as pass 1, pass 2, etc. in order to distinguish between different primary scannings. A sequence of dots aligned in the primary scanning direction is referred to as a raster, and the rasters are denoted by a raster number in the description in order to distinguish between different rasters. To distinguish between the formed positions of dots constituting the rasters, the dot formation positions in the rasters are specified by pixel position numbers assigned along the primary scanning direction. As an embodiment of drive control of the print head 90 and other components in the present example, two-way printing is performed in which ink is discharged during both forward movement and backward movement of the print head 90, wherein the overlap number is "2," the nozzle pitch is "2," and the paper-feeding rate is "5." The overlap number is the number of primary scannings needed in order to fully cover one raster by dots, the raster being formed in the primary scanning direction. The nozzle pitch is the number of dots between the center of nozzles that are adjacent in the secondary scanning direction, and is also a number greater by 1 than the number of rasters (dots) between two adjacent nozzles. The paper-feeding rate is the amount (number of rasters) by which the print head 90 is conveyed in the secondary scanning direction in a single primary scan.

Figure 3:
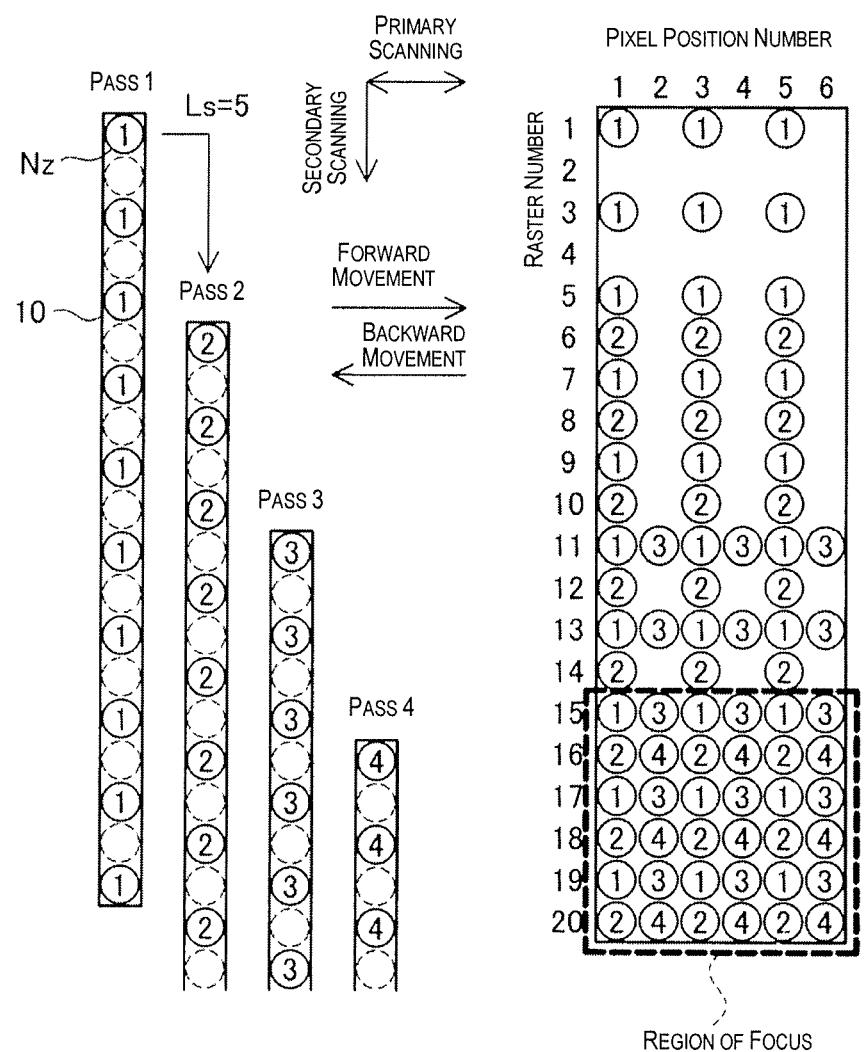
FIG. 3 is an explanatory diagram showing the design of dot formation in the head movement unit 20.

In pass 1, which is the first pass shown in FIG. 3, dots are formed in the pixels (dot formation positions) whose pixel position numbers are 1, 3, and 5, from among the ten rasters whose raster numbers are 1, 3, 5, 7, 9, 11, 13, 15, 17, and 19. Between the forward and backward movement of the print head 90, pass 1 is forward movement. Between forward movement and backward movement, the forward movement in the present embodiment is a primary scan in which ink is discharged relatively first in the same raster. The circles shown in FIG. 3 indicate dot formation positions, and the numerals printed inside the circles are pass numbers.

When the primary scan of pass 1 ends, the print medium is moved (this movement is referred to as secondary scan feeding) by a paper feeding amount Ls (5 in this case) in the secondary scanning direction. For the sake of convenience of illustration in FIG. 3, the print head 90 is shown as not moving in the secondary scanning direction. When the secondary scan feeding ends, pass 2 is performed, which is the second pass. In pass 2, dots are formed in the pixels whose pixel position numbers are 1, 3, and 5, from among the ten rasters whose raster numbers are 6, 8, 10, 12, 14, 16, 18, 20, 22, and 24. Between the forward and backward movement of the print head 90, pass 2 is backward movement. The two rasters numbered as 22 and 24 are omitted from the drawing.

When pass 2 ends, pass 3 is performed after another secondary scan feeding has been performed as previously described. In pass 3, dots are formed in the pixels whose pixel position numbers are 2, 4, and 6, from among ten primary scan lines including the primary scan lines whose raster numbers are 11, 13, 15, 17, and 19. Between the forward and backward movement of the print head 90, pass 3 is forward movement.

When pass 3 ends, pass 4 is performed after another secondary scan feeding has been performed as previously described. In pass 4, dots are formed in the pixels whose pixel position numbers are 2, 4, and 6, from among ten primary scan lines including the three primary scan lines whose raster numbers are 16, 18, and 20. Between the forward and backward movement of the print head 90, pass 4 is backward movement.

Figure 4:
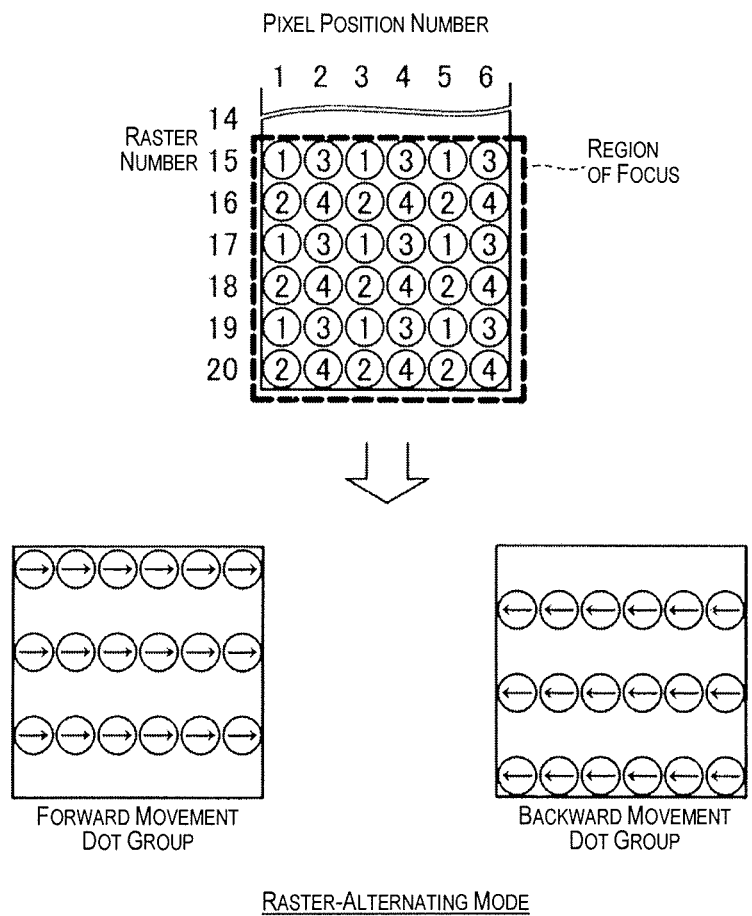
FIG. 4 is an explanatory diagram showing a forward-movement dot group and a backward-movement dot group constituting a printed image.

Thus, if paper is fed and dots are formed while the print head 90 repeatedly moved forward and backward, dots can be formed without gaps in the secondary scan positions whose raster numbers are 15 and up. The printed image formed in this manner is observed by focusing on a certain region. For example, if the region of focus is the region where the raster numbers are 15 through 20 and the pixel position numbers are 1 through 6, and this region of focus is observed to determine whether dots have been formed by forward movement or backward movement, the printed image of the region of focus is formed by a forward movement dot group corresponding to forward movement and a backward movement dot group corresponding to backward movement, as shown in FIG. 4. As is clear from the above description, the printer 20 discharges inks and forms dots in forward movement and backward movement at multiple different timings while changing the ink discharge positions on the print medium, and outputs a printed image formed by combining the forward movement dot group and the backward movement dot group together.

In the embodiment of dot formation described above, the outputted printed image all of the pixels constituting one raster are formed in either the forward movement dot group or the backward movement dot group as shown in FIG. 4, and the forward movement dot group and backward movement dot group are formed by replacement with raster units in the secondary scanning direction. In the present embodiment, the interlacing process, which outputs a printed image configured according to these forward movement and backward movement dot groups, is also referred to as raster-alternating mode.

Figure 5:
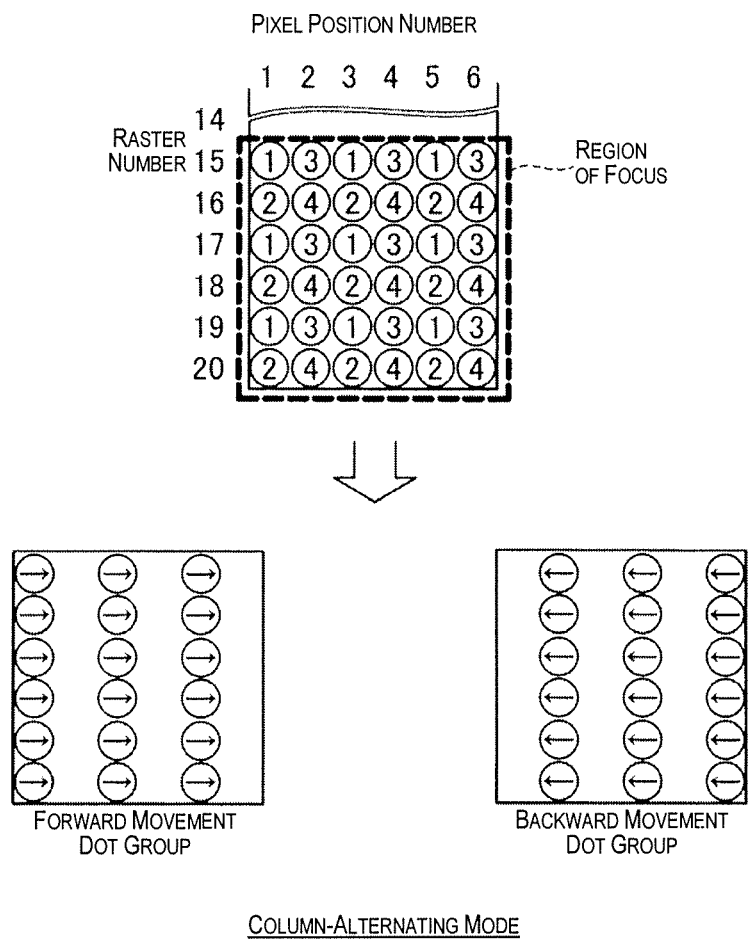
FIG. 5 is an explanatory diagram showing second example of a forward-movement dot group and a backward-movement dot group.

The configurations of the forward movement dot group and backward movement dot group in the printed image are not limited to this raster-alternating mode, and can have various embodiments according to the settings of the specifications of the interlacing process. For example, another possible embodiment is one in which all of the pixels associated with the same pixel position number are formed with either the forward movement dot group or the backward movement dot group, and the forward movement dot group and backward movement dot group are formed by replacement with pixel position units in the primary scanning direction, as shown in FIG. 5. The interlacing process which outputs a printed image having this configuration is also referred to as column-alternating mode.

Figure 6:
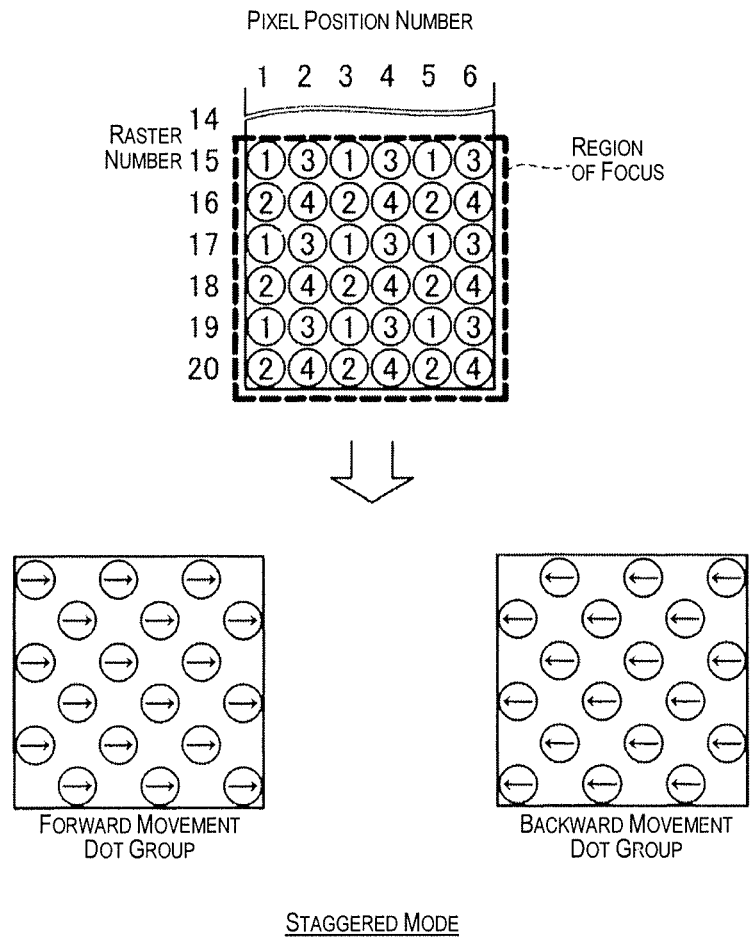
FIG. 6 is an explanatory diagram showing a third example of a forward-movement dot group and a backward-movement dot group.

Another possible embodiment is one in which the pixels of the forward movement dot group or the pixels of the backward movement dot group are formed alternately along the primary scanning direction and the secondary scanning direction, as shown in FIG. 6. The interlacing process which outputs a printed image having this configuration is also referred to as staggered mode.

A-3. Details of the Halftone Process

Figure 7:
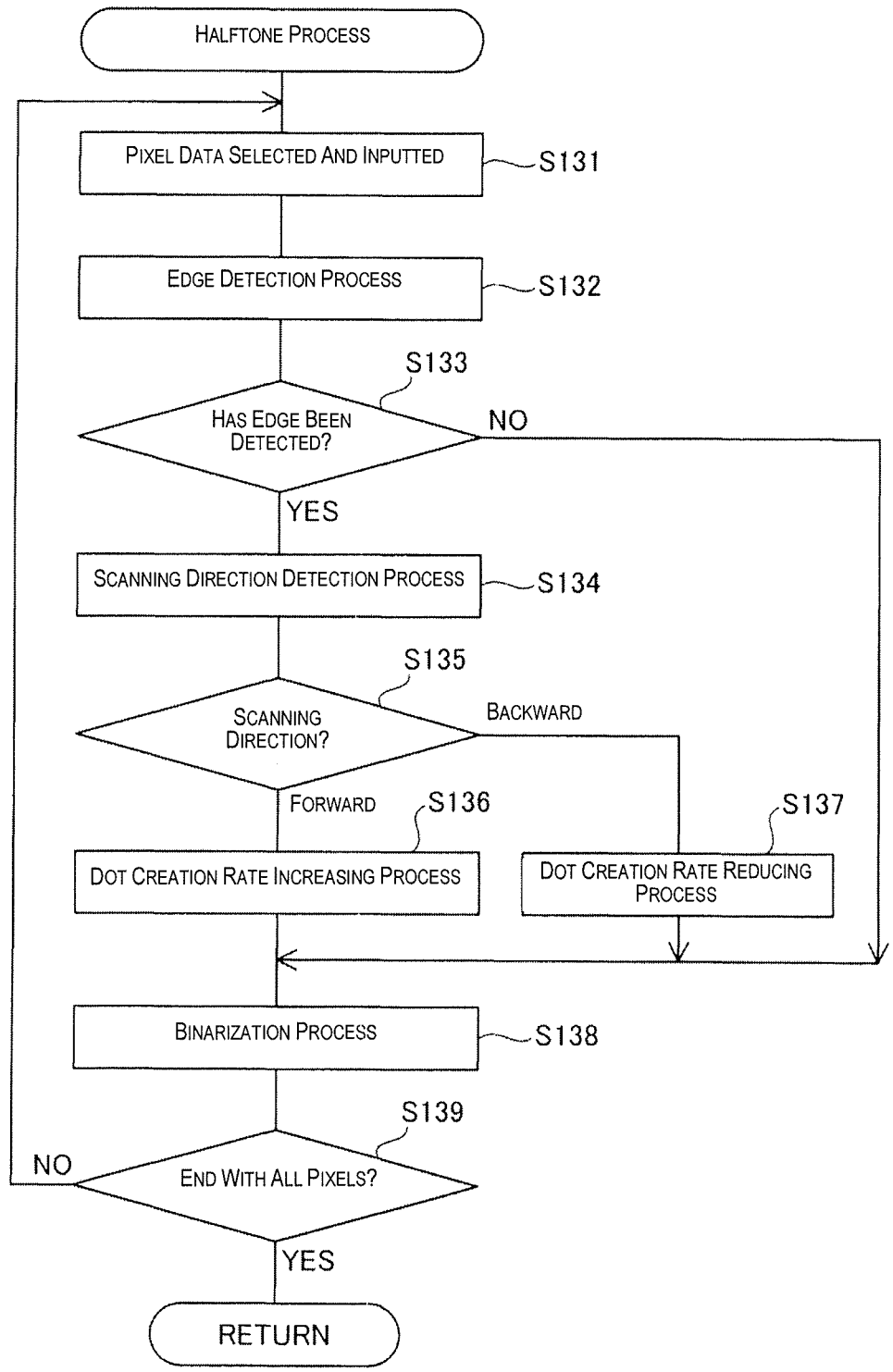
FIG. 7 is a flowchart showing the flow of the halftone process in the printing process.

The details of the halftone process performed in the above-described printing process will now be described. The flow of the halftone process in the present embodiment is shown in FIG. 7. This halftone process is performed with color that has been converted in step S120. When the halftone process is initiated, the CPU 40 first selects the data of one pixel as a target pixel from among the image data that has undergone the color conversion process in step S120, and inputs this pixel data as a target pixel data (step S131).

When the target pixel data is inputted, the CPU 40 performs an edge detection process as a process of the edge detection unit 42 (step S132). In the present embodiment, the edge detection process is performed in the following manner. First, the following formula (1) is used to find the difference DE between the target pixel data, which in this case is a pixel data D0 (x, y) (x represents a coordinate in the primary scanning direction and y represents a coordinate in the secondary scanning direction), and a pixel data D1 (x, y) which results from performing the smoothing process on the pixel data D0 (x, y). The pixel data D1 (x, y) herein is found through the following formula (2). Specifically, the pixel data D1 (x, y) is the average of the tone values of a total of five pixels, which are the target pixel and its four surrounding pixels above, below, and to the left and right. The method of calculating the pixel data D1 (x, y) is not particularly limited, and the data may be the average of the tone values of a total of nine pixels, which are the target pixel and its surrounding eight pixels.

$$DE=D0(x,y)-D1(x,y) \quad (1)$$

$$D1(x,y)=\{D0(x,y)+D0(x-1,y)+D0(x+1,y)+D0(x,y-1)+D0(x,y+1)\}/5 \quad (2)$$

With pixels that do not constitute an edge (hereinbelow also referred to as non-edge pixels), there is no large difference in color tone value between the target pixel and its surrounding pixels; therefore, in cases in which the target pixel does not constitute an edge, the value does not change by much between the tone value of the target pixel and the tone value of the target pixel after smoothing. With pixels constituting an edge (hereinbelow also referred to as edge pixels), the color tone values change suddenly in the surrounding pixels; therefore, if the target pixel is in an edge, there is a value difference to a certain extent between the tone value of the target pixel and the tone value of the target pixel after smoothing. Therefore, if the target value of the difference DE is compared with a threshold TH1, it can easily be determined whether or not the target pixel constitutes an edge.

Specifically, if |DE|>TH1 (TH1 is a positive threshold value), the target pixel is determined to be in an edge, and if |DE|≤TH1, the target pixel can be determined to not constitute an edge.

The edge image constituting the edge has a high-concentration edge constituting one side of the edge and a low-concentration edge constituting the other side of the edge. In the method of detecting the edge pixels described above, if the difference DE is a positive value, the target pixel can be determined to be a high-concentration edge pixel, and if the difference DE is a negative value, the target pixel can be determined to be a low-concentration edge pixel. Therefore, it is preferably determined whether or not DE>TH1 in order to detect only high-concentration edge pixels. If DE>TH1, the target pixel can be determined to be a high-concentration edge pixel. In the present embodiment, only high-concentration edge pixels are detected in step S132 by the method described above. Thus, when only high-concentration edge pixels are detected, high-concentration edge pixels are easily visible but low-concentration edge pixels are not easily visible, and the target of the processes of steps S134 through S137 (described hereinafter) performed in order to suppress edge blurring is therefore limited to high-concentration edge pixels. If so, the speed of the halftone process can be increased. Low-concentration edge pixels may also be detected at the same time.

In the example described above, a configuration was presented in which edges are detected in two-dimensional directions (directions combining the primary scanning direction and the secondary scanning direction), but the edges may also be detected in a one-dimensional direction. For example, in cases in which positional deviation between the forward movement dot group and the backward movement dot group occurs mainly in the primary scanning direction, it is acceptable to detect only edges in a direction parallel to the primary scanning direction. In this case, the pixel data D1 (x, y) used in formula (1) above may be the average of the tone values of a total of three pixels, which are the target pixel and the two pixels to the left and right, for example. In other words, it is acceptable to detect only the edges in a direction in which positional deviation readily occurs. If so, the speed of the process can be increased. Moreover, with pixels constituting an edge in a direction in which positional deviation readily occurs, since the processes of steps S134 through S137 (described hereinafter) are performed, the effect of suppressing the edge blurring that accompanies positional deviation can be sufficiently achieved.

The method of detecting edges in step S132 is not limited to the example described above, and various conventional methods can be used. For example, the edges may be detected by differentiating the tone values. The edges do not necessarily need to be detected for every ink color, and may be detected based on the average of the tone values of at least two colors from among C, M, Y, K, Lc, and Lm, which are the ink colors of the present embodiment. For example, the edges may be detected based on the average of the tone values of C, M, Y, K, which are the most conspicuous. The edges may also be detected based on the average of the RGB tone values prior to the color conversion process. In these cases, the processes of steps S134 through S137, described hereinafter, may be performed on the color components used as the basis of edge detection.

When the edge detection process is performed in this manner, the CPU 40 determines whether or not the target pixel has been detected as an edge (step S133). In the present embodiment, this determination is a determination of whether or not the target pixel has been detected as a high-concentration edge pixel. As a result, if the pixel is not detected as an edge (step S133: NO), the CPU 40 performs a binarization process (step S138). In the present embodiment, this binarization process is performed by systematic dithering as described above. Specifically, a comparison is made between the threshold that is applied to the target pixel from among the plurality of thresholds constituting the dither mask and the pixel data D0 (x, y), and if the pixel data D0 (x, y) is greater than the threshold, the dot of the target pixel is determined to be ON, whereas if the pixel data D0 (x, y) is less than the threshold, the dot is determined to be OFF. In the present embodiment, the dither mask used in the binarization process is created so that the forward movement dot group, the backward movement dot group, and the overall dot group combining the forward movement dot group and backward movement dot group have blue noise characteristics or green noise characteristics.

If the target pixel is detected as an edge (step S133: YES), the CPU 40 performs a scanning direction detection process (step S134). This process is a process for detecting the scanning direction (forward or backward) with which the dot of the target pixel is formed. In the present embodiment, since the raster-alternating mode (see FIG. 4) is used as the embodiment of dot formation, the scanning direction with which the target pixel is formed can be determined as forward if the coordinate value y of the target pixel is an odd number and backward if the coordinate value y is an even number. In cases in which the column-alternating mode (see FIG. 5) is used, the scanning direction in which the target pixel is formed can be determined as forward if the coordinate value x of the target pixel is an odd number and backward if the coordinate value x is an even number. In cases in which the staggered mode (see FIG. 6) is used, the scanning direction in which the target pixel is formed can be determined as forward if the coordinate value x+y of the target pixel is an odd number and backward if the coordinate value x+y is an even number.

As a result of the scanning direction detection process, if the scanning direction in which the dot of the target pixel is formed is forward (step S135: forward), the CPU 40 performs a dot creation rate increasing process (step S136). The dot creation rate increasing process is a process for ensuring a high probability that the dot of the target pixel will be formed in the binarization process (step S138). In the present embodiment, this is a process for increasing the tone value D0 of the target pixel as the tone data that is the target of the binarization process. Specifically, a value obtained by a calculation of multiplying the tone value D0 by K (K being a value greater than 1) is used as the tone value that is the target of the binarization process. The value of K may be fixed, but in the present embodiment, different values are set according to the tone value. In the present embodiment, the tone value can be expressed in 256 tones, 0 through 255, and when the value of D0 times K is greater than 255, the value 255 is used as the tone data that is the target of the binarization process. Thus, when the dot creation rate increasing process is performed, the CPU 40 performs the above-described binarization process using the value of the increased tone value D0 of the target pixel (step S138).

If the scanning direction in which the dot of the target pixel is formed is backward (step S135: backward), the CPU 40 performs a dot creation rate reducing process (step S137). The dot creation rate reducing process is a process for ensuring a low probability that the dot of the target pixel will be formed in the binarization process (step S138). In the present embodiment, for the tone data that is the target of the binarization process, when the same tone value D0 is inputted, a calculation determines the value of the tone value D0 of the target pixel reduced by the same amount of the increase in step S136 according to the tone value D0, and this value is used as the tone data that is the target of the binarization process. Thus, in cases in which an edge image is formed equally by forward movement and backward movement by setting the amount of increase in step S136 and the amount of reduction in step S137 to the same amount, there is stochastically no change in the average tone value in the edge image overall, and the edge image can therefore be produced accurately. However, the amount of increase in step S136 and the amount of reduction in step S137 may also be set to different amounts. When the dot creation rate reducing process is performed in this case, the CPU 40 performs the above-described binarization process using the reduced value of the tone value D0 of the target pixel (step S138).

When binarization is performed in this manner, the CPU 40 repeats the process of steps S131 through S138 for all of the pixels of the image data (step S139) and ends the halftone process.

The printer 20 of this configuration detects the edge pixels and forms dots disproportionately in forward movement wherein dots are formed in the common print region of the print medium in dot formation pixels corresponding to the edge pixels. Therefore, it is possible to suppress positional deviation of dots resulting from the differences between forward movement and backward movement. As a result, blurring in the edges of the printed image can be suppressed. Moreover, since the differences between forward movement and backward movement are the main cause of positional deviation, blurring in the edges of the printed image can be suitably suppressed. The above-described are also achieved if the printer 20 forms dots disproportionately in forward movement in only the ink colors constituting the edges, as is made clear from the above descriptions. The printer may also be configured to form dots disproportionately in backward movement instead of forward movement.

The printer 20 forms dots disproportionately in forward movement in which ink is discharged relatively first in the common print region between forward movement and backward movement in the dot formation positions corresponding to the edge pixels. Specifically, since a large amount of ink is discharged in a state in which ink has not been discharged into the common print region, positional deviation due caused by cockling can be suppressed. As a result, blurring of the edges of the printed image can be suppressed.

Since the printer 20 performs the halftone process by using a dither mask created so that the forward movement dot group, the backward movement dot group, and the total dot group combining the forward movement dot group and backward movement dot group have blue noise characteristics or green noise characteristics, a satisfactory dispersion of dots can be guaranteed in the overall printed image and worsening of the graininess of the printed image can be suppressed even if dots are formed disproportionately in forward movement.

Figure 8:
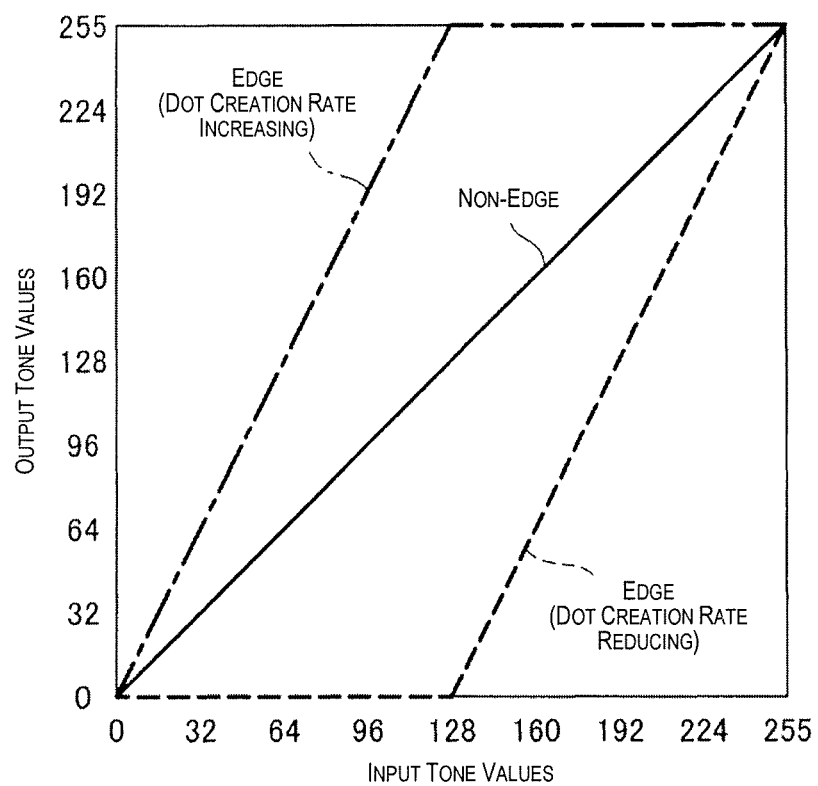
FIG. 8 is an explanatory diagram showing a first example of an LUT used in the halftone process.

In the embodiment described above, a configuration was presented in which the dot creation rate increasing process and the dot creation rate reducing process were performed by calculations, but they by also be performed by referring to an LUT (look up table) in which the correlation between input tone values and output tone values (the tone values provided for binarization) is established in advance. If so, the calculation load can be reduced. A first specific example of this LUT is shown in FIG. 8. In FIG. 8, the correlation between input tone values and output tone values in the non-edge pixels, i.e., the correlation in which input tone values and output tone values are the same is also shown as a reference. In this example, in the LUT referred to in the dot creation rate increasing process, the range of input tone values is 0 to 127 and the output tone values increase in direct proportion from 0 to 255. In the input tone value range of 128 to 255, the output tone value is constant at 255. In the LUT referred to in the dot creation rate reducing process, the range of input tone values is 0 to 127, and the output tone value remains constant at 0. In the input tone value range of 128 to 255, the output tone values increase in direct proportion from 0 to 255.

The dot creation rate increasing process is performed for pixels corresponding to forward movement, and the dot creation rate reducing process is performed for pixels corresponding to backward movement. Therefore, in the example in FIG. 8, dots are always formed only in forward movement in the edge pixels in the input tone value range of 0 to 127, and the dots formed in backward movement are increased according to the increase in tone value in the edge pixels in the input tone value range of 128 and up. Thus, if dots are formed only in forward movement in the edge pixels in a tone value range of 0 to 127, in this tone value range there will be no positional deviation between the dots formed in forward movement and the dots formed in backward movement. Moreover, since the tone value range of 0 to 127 is the maximum range in which dots can be formed in only forward movement or only backward movement, the effect of preventing positional deviation can be achieved at a maximum.

Figure 9:
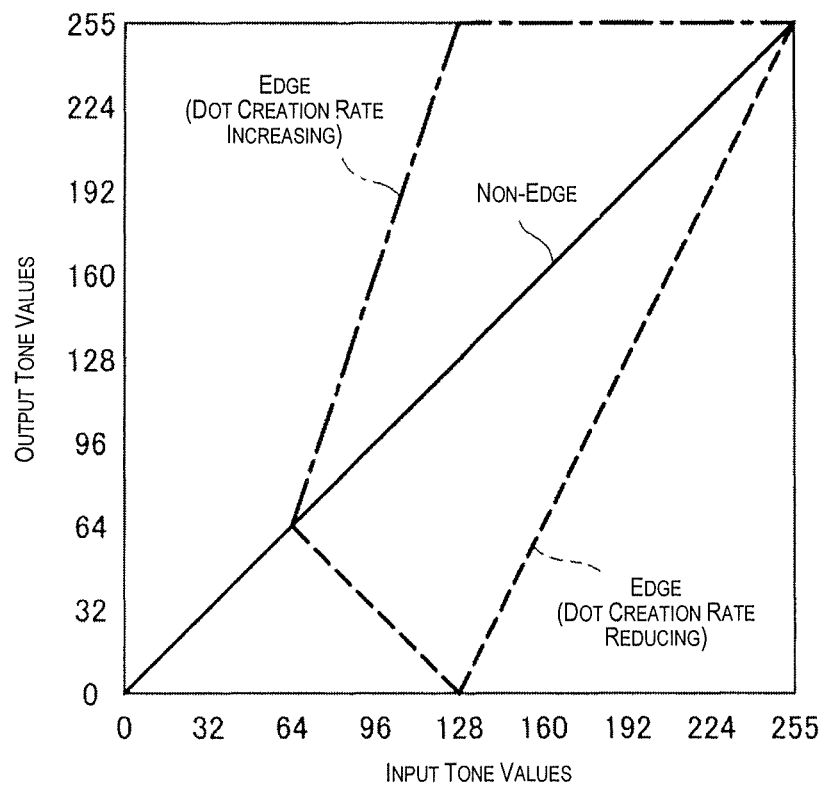
FIG. 9 is an explanatory diagram showing a second example of an LUT used in the halftone process.

A second specific example of an LUT is shown in FIG. 9. In this example, in a tone value range of 0 to 63 as shown in the graph, input tone values and output tone values are set to the same values in both the dot creation rate increasing process and the dot creation rate reducing process. In this configuration, the formation of the dots of the edge pixels is disproportionate in forward movement in a tone value range of 64 and up. In this example, since the edges are not easily visible in low-tone print regions, positional deviation is permitted between dots formed in forward movement and dots formed in backward movement. Thus, when positional deviation is permitted in low-tone regions, in the halftone process shown in FIG. 7, target pixels having tone values of a predetermined value or lower may be subjected to the binarization process (Step S139) alone with steps S132 through S137 omitted. The speed of the halftone process can then be increased. In the example of FIG. 9, the configuration is such that in a tone value range of 64 and up, the imbalance in forward movement in which the dots of the edge pixels are formed is varied incrementally. If this configuration is used, the conditions of printing device are not greatly changed by subtle changes in the tone value, and changes in the conditions of positional deviation are therefore not easily visible. As is made clear from the above descriptions, the dots of the edge pixels do not need to be formed in forward movement alone even if the tone value is 127 or less, but the number of dots formed in forward movement is preferably greater than the number of dots formed in backward movement.

Figure 10:
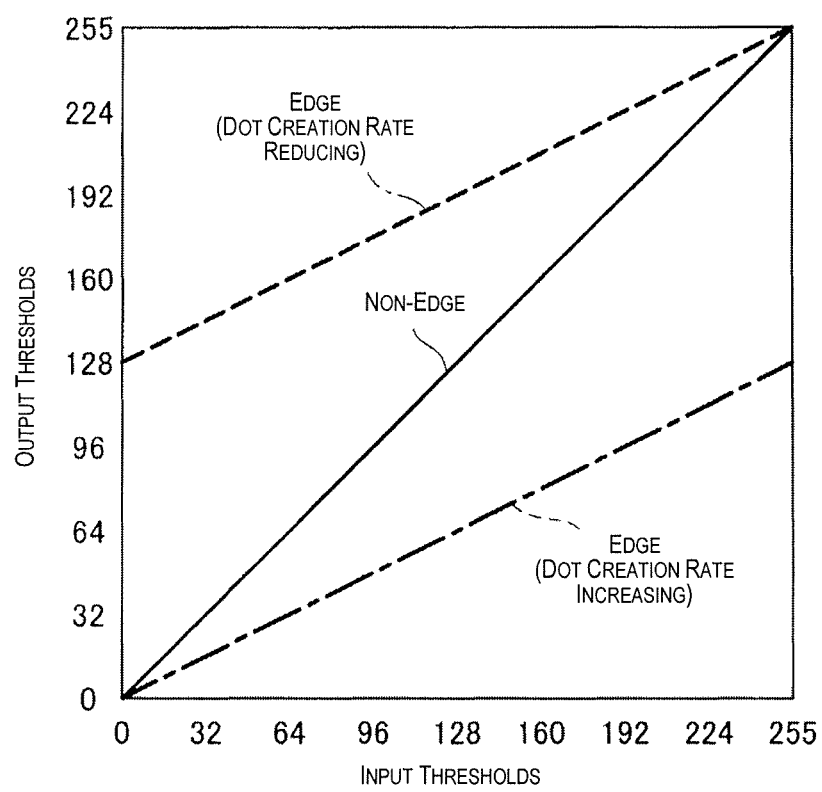
FIG. 10 is an explanatory diagram showing a third example of an LUT used in the halftone process.

In the embodiment described above, a configuration was presented in which the dot creation rate increasing process and the dot creation rate reducing process are performed by increasing or reducing the tone value that is the target of the binarization process, but also possible is a configuration in which the threshold of the dither mask used in the binarization process is increased or reduced instead of increasing or reducing the tone value. In this case, the thresholds of the dither masks created in the dot creation rate increasing process and the dot creation rate reducing process may be found by referring to an LUT in which the correlation between input thresholds (thresholds supplied for binarization in non-edge pixels) and output thresholds (thresholds supplied for binarization in edge pixels) is established in advance. A specific example of such an LUT is shown in FIG. 10. In FIG. 10, the correlation between input thresholds and output thresholds in non-edge pixels, i.e. the correlation in which input thresholds and output thresholds are equal is also shown as a reference. In this example, in the LUT referred to in the dot creation rate increasing process, when the input threshold values are in a range of 0 to 255, the output threshold values are increased in direct proportion from 128 to 255, as shown in the graph. In the LUT referred to in the dot creation rate reducing process, when the input threshold values are in a range of 0 to 255, the output thresholds are increased in direct proportion from 0 to 127. The formation of edge pixels can be disproportionate toward forward movement in this case as well.

In cases in which the thresholds of the dither masks are controlled, instead of the LUT conversion of thresholds, another possible configuration is one in which a first dither mask for non-edge pixels, a second dither mask for increasing dot creation efficiency, and a third dither mask for reducing dot creation efficiency are stored, and the dither mask to be used in the binarization process is selected according to whether or not the pixel is an edge pixel and whether the pixel corresponds to forward movement or backward movement from among the first through third dither masks. For example, if the threshold value is set in a range of 0 to 127 for the second dither mask and the threshold value is set in a range of 128 to 256 for the third dither mask, process can be the same as the binarization process that uses the LUT conversion described above.

In the embodiment described above, an example of a printer 20 was presented in which only dots of one size are formed, but in cases in which the printer 20 is capable of forming dots of two or more sizes, the halftone process for making dot formation disproportionate towards forward movement or backward movement may be performed for dots of all sizes or for dots of only some sizes. When the halftone process is performed for dots of only some sizes, the target need only be the dots susceptible to positional deviation. For example, in cases in which the ink discharge speed differs depending on dot size, dots formed at a slow discharge speed require a relatively long time to be deposited on the print medium after ink is discharged, and the distance of positional deviation tends to be large with even a small deviation in discharge timing. Another option is that the target be only dots that are relatively easily visible, i.e. dots that are relatively large. If the halftone process of causing dot formation to be disproportionate in forward movement or backward movement is performed only on dots of some sizes in this manner, the speed of the process can be increased while effectively achieving predetermined effects.

B. Second Embodiment

Figure 11:
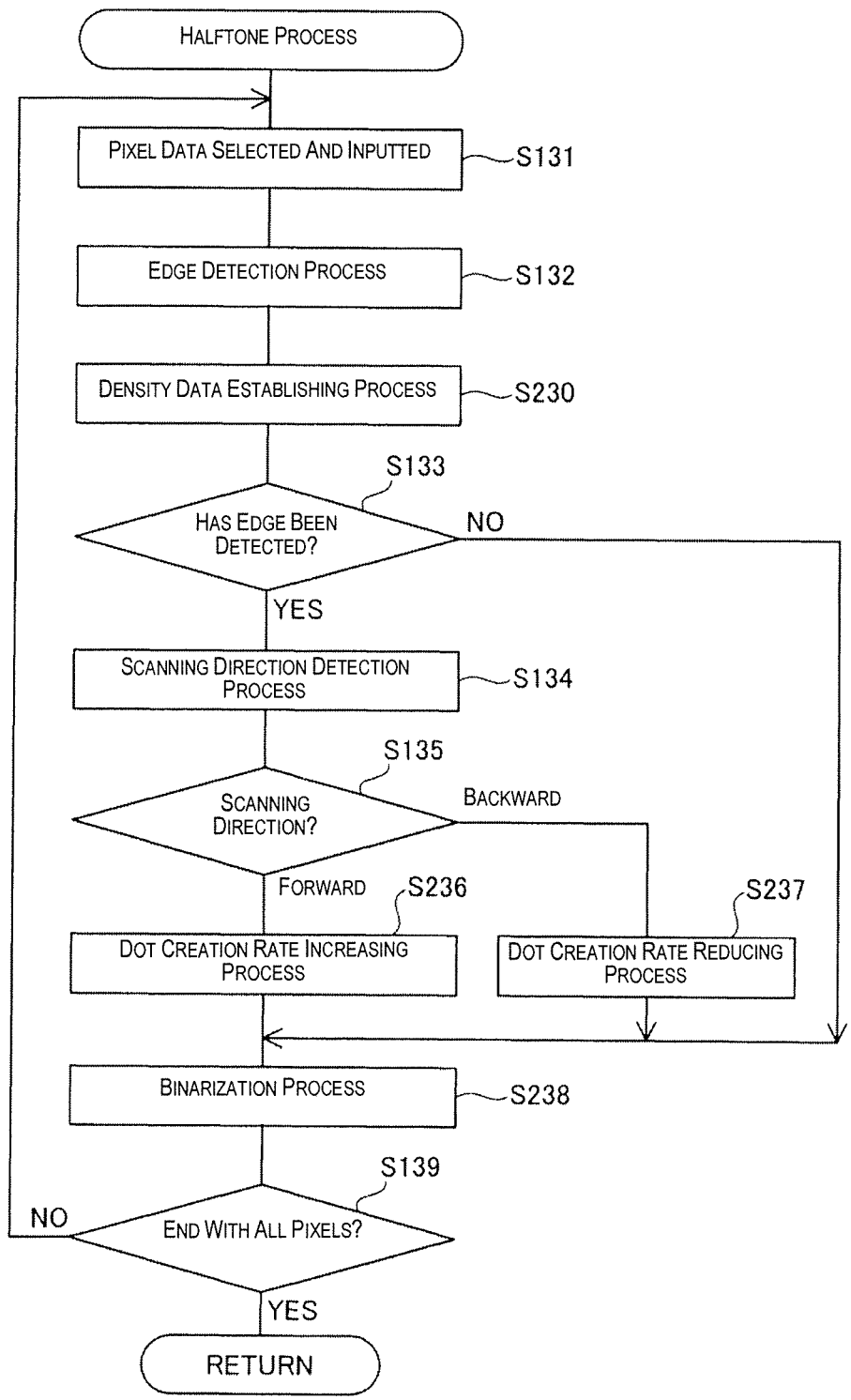
FIG. 11 is a flowchart showing the flow of a halftone process as a second embodiment.

The second embodiment of the present invention will be described. The printer 20 of the second embodiment is different from that of the first embodiment in that ink of two or more sizes can be discharged and the specifics of the halftone process are different. Only the points that differ from the first embodiment are described hereinbelow. The flow of the halftone process of the second embodiment is shown in FIG. 11. In FIG. 11, processes identical to those of the first embodiment are denoted by the same symbols as FIG. 7 and are not described in detail. When the halftone process of the second embodiment is initiated, the CPU 40 inputs the target image data and performs the edge detection process (step S132).

When the edge detection process is performed, the CPU 40 performs a density data establishing process as a process of a density data establishing unit 45 (not shown) (step S230). The density data establishing process is a process of establishing density data for each dot of the two or more sizes based on the inputted target image data. In the present embodiment, the density data established is different between cases in which the target pixel is an edge pixel and cases in which the target pixel is a non-edge pixel. The density data herein is data expressing the degree of density with which the dot is formed. The density data expresses that dots are formed with greater density as the tone value increases. For example, a tone value of "255" in the density data expresses that the dot formation density is 100%, i.e. that dots are formed in all of the pixels, and a tone value of "0" in the density data expresses that the dot formation density is 0%, i.e. that dots are not formed in any of the pixels.

Figure 12:
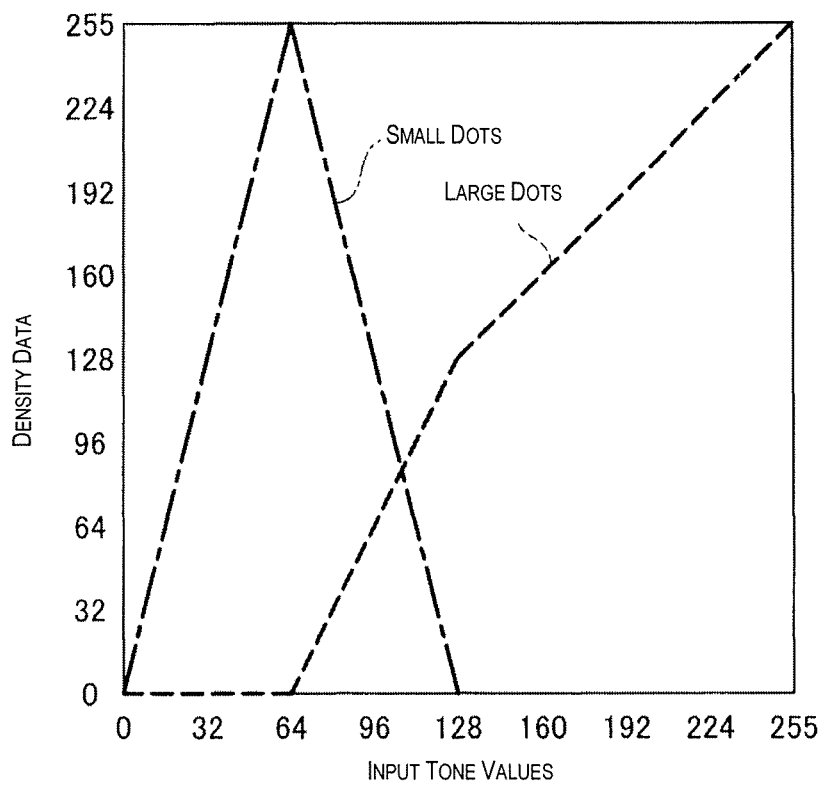
FIG. 12 is an explanatory diagram showing a specific example of an LUT for establishing density data of large dots and small dots.

In the present embodiment, the density data of non-edge pixels is established by referring to an LUT in which the correlation between input tone values and density data is established in advance. The density data may also be calculated by a computation using a predetermined function. A specific example of the LUT is shown in FIG. 12. The printer 20 herein is described as one that forms dots of two sizes. Of these two sizes, the relatively larger dots are referred to as large dots, and the relatively smaller dots are referred to as small dots. It is also an option to form dots of three or more sizes, such as large dots, medium-sized dots, and small dots. In the present embodiment, the amount of ink in a large dot is equivalent to four times the amount of ink in a small dot. In the LUT for establishing density data, in an input tone value range of 0 to 64, the density data value of small dots increases in direct proportion from 0 to 255, and the density data value of large dots remains 0, as shown in the graph. In an input tone value range of 64 to 128, the density data value of small dots decreases in direct proportion from 255 to 0, and the density data value of large dots increases in direct proportion from 0 to 127. In an input tone value range of 128 to 255, the density data value of small dots remains 0, and the density data value of large dots increases in direct proportion from 128 to 255. In this example, the total value between the density data of small dots and the density data of large dots is set so as to be equal to the total value (large dot conversion) between the input tone values and the density data if the density data of small dots is converted to large dots (large dots are ¼ of small dots). In other words, this LUT stipulates the ratio between small dots and large dots for expressing the input tone values.

For the density data of edge pixels, the density data is found by referring to an LUT similar to non-edge pixels, and the density data is corrected based on a predetermined rule. In comparison with non-edge pixels, this process is a process for reducing the values of density data of small dots and increasing the density data of large dots by the amount of the reduction. For example, the value of small dot density data found from the LUT is reduced by 50%, and this amount (12.5% by large dot conversion in the example of FIG. 12) is added to the large dots.

When the density data establishing process is performed in this manner and the target pixel is an edge pixel (step S133: YES), the CPU 40 performs a dot creation rate increasing process (step S236) or a dot creation rate reducing process (step S237) in accordance with the scanning direction corresponding to the edge pixels (steps S134, S135). These steps S236 and S237 are essentially the same processes as steps S136 and S137 in the first embodiment, but differ in that the input tone values were increased or reduced in the first embodiment, whereas the density data of large and small dots are increased or reduced in this case.

When performing the dot creation rate increasing process or the dot creation rate reducing process, the CPU 40 performs a binarization process (step S238) based on the increased or reduced large dot and small dot density data. When the target pixel is a non-edge pixel, the density data established in step S230 is the target of the binarization process (step S133: NO). Since the binarization process of large dots and small dots is conventionally known (e.g. Japanese Laid-open Patent Publication No. 2007-142848), the process is not described in detail, but the process can be performed in the following manner, for example. First, the large dot density data and the dither mask threshold are compared, and if the density data is greater than the threshold, the large dot is determined to be ON. If the density data is equal to or less than the threshold, the small dot density data is added to the large dot density data and the total value is compared with the threshold. As a result, if the total value is greater than the threshold, the small dot is determined to be ON. If the density data is equal to or less than the threshold, the target pixel is designated as dot OFF.

When the binarization process is performed, the CPU 40 repeats the processes of steps S131 to S238 on all of the pixels (step S139) and ends the halftone process.

In the printer 20 of this configuration, the density data is established so that density data of dots of a relatively small size among the dots of two or more sizes in the edge pixels is smaller than that of the non-edge pixels. In other words, the density data is established so that the ratio of relatively small dots to all dots is less for edge pixels than for non-edge pixels. Since small dots have a relatively small amount of ink, a relatively large number of dots are formed in order to express the tone of the inputted image data. Therefore, the degree of freedom in the process of forming dots disproportionately towards small dots tends to be limited. For example, when the density data value is 128 or greater, the primary scanning for forming the dots of the edge pixels cannot be disproportionate in only forward movement or backward movement. Furthermore, when the density data value is 255, there cannot be an imbalance toward forward movement or backward movement. According to the configuration described above, such limits are unlikely even when the small dot density data is a large value, and the primary scanning for forming the dots of the edge pixels can therefore be suitably made disproportionate in forward movement or backward movement. If the density data value is corrected to 128 or less, the formation of small dots can be made completely disproportionate in either forward movement or backward movement.

In the embodiment described above, the density data of small dots and large dots were corrected for all of the inputted tone values, but it is also an option to perform such a process only in a predetermined tone range. For example, it is an option to perform the process in an input tone value range in which the small dot density data value is 128 or greater. This is because when the small dot density data value is 127 or less, the formation of small dots can be made completely disproportionate in either forward movement or backward movement even if the correction is not made. If so, the speed of the process can be increased.

In the embodiment described above, small dot and large dot density data was corrected by a calculation process for the edge pixels, but it is also an option to separately prepare an LUT for edge pixels and to find the small dot and large dot density data by referring to this LUT. In cases in which the printer 20 is capable of forming dots in three sizes: large, medium, and small, it is an option to perform a correction for reducing the density data for only the small dots, or to perform a correction for reducing the density data for the small dots and medium dots.

C. Modifications

Modifications of the embodiment described above will now be described.

C-1: Modification 1

In the embodiment described above, a configuration was presented in which the halftone process was performed by dithering, but the halftone process may also be performed using other methods. For example, the halftone process may be performed using error diffusion. In this case, during the dot creation rate increasing process, it is preferable to perform a process for reducing the threshold used in dot ON/OFF determination error diffusion. Conversely, a process for increasing the threshold is preferably performed during the dot creation rate reducing process. Of course, the input tone value may be increased or reduced instead of increasing or reducing the threshold. Such manipulating of the threshold or tone value may be performed using an LUT or by calculation.

In the embodiment described above, a configuration was presented in which edge pixel dots are formed disproportionately in either forward movement or backward movement only for edge pixels, but also acceptable is a configuration in which this process is performed for pixels in a predetermined width range along the primary scanning direction and/or the secondary scanning direction from the edge pixels. In this case, the configuration may be designed so that the extent of the imbalance is varied incrementally. To vary the extent of the imbalance, the amount of increase or decrease in the tone value or another parameter in the dot creation rate increasing process and the dot creation rate reducing process may be multiplied by an adjustment coefficient, for example. If so, the change in the ratio between the forward movement dot group and the backward movement dot group can be reduced, and a printed image can be obtained in which this change is inconspicuous.

C-2. Modification 2

In the embodiment described above, a configuration was presented in which edge pixel dots are formed with an imbalance toward only forward movement or only backward movement for all of the edge pixels, but the configuration may also be designed so that disproportionate primary scanning is different between edge pixels at one end relating to a single letter or line and edge pixels at the other end. Specifically, the halftone process may be performed so that with one sequence of image data in the primary scanning direction, dots are formed disproportionately in one of the movements between forward and backward for high-concentration edge pixels detected the Nth time (N being an integer of 1 or greater), and dots are formed disproportionately in the other of the movements between forward and backward for high-concentration edge pixels detected the N+1 time.

Figure 13:
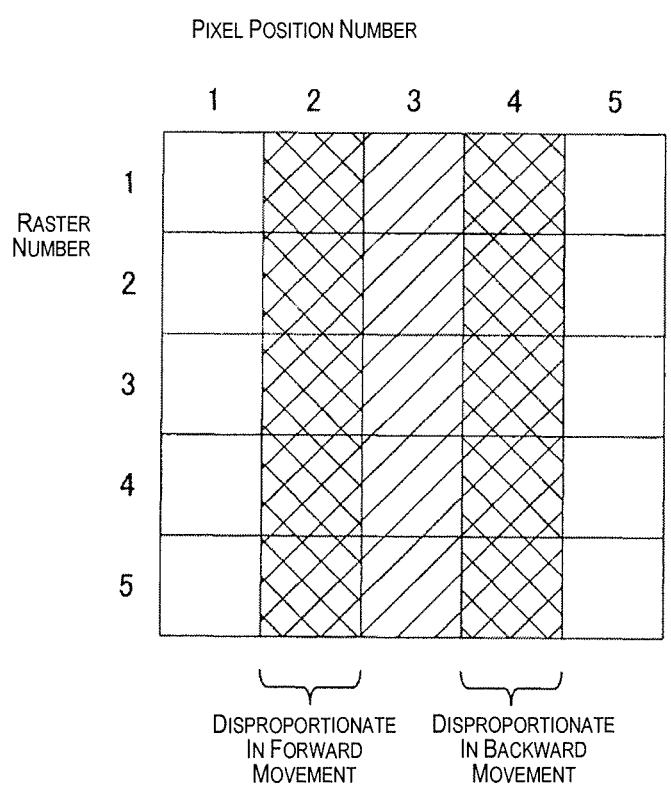
FIG. 13 is an explanatory diagram showing the specifics of a halftone process as a modification.

A specific example of such a configuration is shown in FIG. 13. The individual squares of the grid shown here each represent a single pixel. In this example, the pixels of the pixel position numbers 1 and 5 shown with empty white space have significantly different tone values from the pixels of the pixel position numbers 2 through 4 shown with hatching. In other words, the pixels in the pixel position numbers 2 through 4 constitute a single line. Therefore, the pixels of the pixel position numbers 2 and 4 shown in cross hatching are detected as edge pixels. In raster number 1, for the high-concentration edge pixel detected the first time (raster number 1, pixel position number 2), the halftone process is performed for forming dots disproportionately in forward movement. Also in raster number 1, for the high-concentration edge pixel detected the second time (raster number 1, pixel position number 4), the halftone process is performed for forming dots disproportionately in backward movement. The same occurs in raster numbers 2 through 5.

Thus, if the disproportionate primary scanning is set in opposite directions at both ends of a single line, the width of the line shown in FIG. 13 (the width in the primary scanning direction) in the case of positional deviation between forward movement and backward movement is either greater or less than in cases in which dots are formed uniformly between forward movement and backward movement, depending on the direction of positional deviation. In the example of FIG. 13, if positional deviation occurs in which backward movement deviates to the right from forward movement, the width of the line is greater, and if positional deviation occurs in which backward movement deviates to the left from forward movement, the width of the line is smaller. As a characteristic of the printer 20, if the positional deviation is evaluated in advance to determine whether backward movement deviates to the right or to the left from forward movement and primary scanning is set to be disproportionate at both ends of the line so that the width of the line is smaller, the width of the line can be reduced and the line can be printed more sharply. The printer 20 may also be designed so that the direction of positional deviation occurs more readily in a predetermined direction.

C-3. Modification 3

In the embodiment described above, a configuration was presented in which edge pixel dots are formed disproportionately in either forward movement or backward movement, but this imbalance is not limited to being either in forward movement or backward movement, and there may also be an imbalance in at least one of the multiple timings with which ink is discharged. For example, the area of focus shown in FIG. 3 can be treated as an image formed by combining together the four dot groups formed in any of the passes 1 through 4, which have multiple timings. In this case, the halftone process may be performed so that dots are formed disproportionately in pass 1, for example. If so, it is possible to suppress the occurrence of positional deviation between the multiple timings of forming dots, similar to the embodiment described above. The halftone process may also be performed so that dots are formed disproportionately in passes 1 through 3. The effects can be achieved to a certain extent in this case as well.

C-4. Modification 4

In the embodiment described above, a serial inkjet printer was presented in which printing is performed in two directions, but the present invention can also be widely applied to printing devices which output a printed image formed by discharging ink from a print head at multiple timings to form dots on a common print region of a print medium, and combining together the dots formed at the multiple different timings. For example, the present invention can also be applied to a line printer in which a plurality of print heads are arrayed in a zigzag formation throughout the entire width direction of the print medium, and adjacent print heads partially overlap each other. In this case, the multiple timings for forming dots are ink discharge timings in print heads placed relatively forward in the paper-feeding direction and print heads placed relatively backward. The present invention can also be applied to cases of line printers in which the nozzle rows of one print head provided across the entire width direction of the print medium are arrayed in a zigzag formation. In this case, the multiple timings for forming dots are ink discharge timings in nozzle rows placed relatively forward in the paper-feeding direction and nozzle rows placed relatively backward.

C-5. Modification 5

In the embodiment described above, the printer 20 was configured such that the entire printing process shown in FIG. 2 was executed, but in cases in which the printing process is performed in a printing system (a broader term for a printing device) in which the printer and a computer (a computer as a terminal, a computer as a print server, or the like) are connected, all or some of the printing process or halftone process may be performed by either one of the computer and the printer.

Embodiments of the present invention were described above, but of the structural elements of the present invention in the embodiments described above, elements other than those put forth in the independent claims are additional elements and can be omitted or combined as is appropriate. The present invention is also not limited to these embodiment, and can of course be implemented in various different forms within a range that does not deviate from the scope of the invention. For example, in addition to a printing device, the present invention can also be actualized as a printing method, a print data creation program, a storage medium on which this program is recorded, and the like.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing device for discharging ink from a print head onto a print medium to print an image, the printing device comprising:
   an input unit configured to input image data constituting the image;
   a detection unit configured to detect pixels constituting at least a high-concentration side of an edge of the image as edge pixels based on the inputted image data;
   a halftone processing unit configured to create dot data expressing whether or not dots are formed based on the image data; and
   a printing unit configured to print the image by combining together dots formed at a forward-movement and a backward-movement in a common print region of the print medium based on the dot data,
   the halftone processing unit being configured to create the dot data so that, in positions on the print medium where dots corresponding to the edge pixels are formed, the dots are formed disproportionately at one of the forward-movement and the backward-movement.

2. The printing device according to claim 1, wherein the halftone processing unit is configured to create the dot data so that dots are formed disproportionately toward a relatively earlier timing with which the ink is discharged into the common print region from among the forward-movement and the backward-movement.

3. The printing device according to claim 1, wherein the halftone processing unit is configured to create the dot data by a dither method in which presence or absence of dots is established using a dither mask including multiple thresholds, and
   the dither mask is created so that each of the dot groups formed with each of the forward-movement and the backward-movement and an overall dot group combining the dot groups have blue noise characteristics or green noise characteristics.

4. The printing device according to claim 1, wherein in the halftone processing unit, the process for forming dots disproportionately is inhibited in cases in which the image data of the edge pixels is of a lower tone than a predetermined value.

5. The printing device according to claim 1, wherein the printing unit is capable of forming dots in two or more sizes,
   the printing device further comprises a density data establishing unit configured to establish density data respectively for the dots of the two or more sizes based on the inputted image data, the density data expressing the density with which the dots are to be formed,
   the halftone processing unit is configured to create dot data based on the established density data, the dot data expressing whether or not the respective dots of the two or more sizes are formed, and
   the density data establishing unit is configured to establish the density data so that the density data of relatively small-sized dots among the dots of the two or more sizes in the edge pixels is smaller than the density data in the pixels that are not edge pixels.

6. The printing device according to claim 1, wherein the printing unit is capable of forming dots in two or more sizes;
   the printing device further comprises a density data establishing unit configured to establish density data respectively for the dots of the two or more sizes based on the inputted image data, the density data expressing the density with which the dots are to be formed,
   the halftone processing unit is configured to create dot data based on the established density data, the dot data expressing whether or not the respective dots of the two or more sizes are formed, and
   the halftone processing unit is configured to create dot data for forming dots disproportionately with one of the multiple timings for only dots among the two or more sizes that are of a size relatively characterized in that the relative positions between dots formed at the forward-movement and the backward-movement readily deviate from the target positions.

7. The printing device according to claim 1, wherein
the printing unit is configured to perform printing while moving the print head relative to the print medium in a primary scanning direction and a secondary scanning direction,
the print head moves relatively one way in the primary scanning direction in the forward-movement, and
the print head moves relatively the opposite way in the same direction in the backward-movement.

8. The printing device according to claim 7, wherein
the halftone processing unit is configured to create the dot data so that dots are formed disproportionately towards one timing of either forward-movement or backward-movement for high-concentration edge pixels detected the Nth time (N is an integer of 1 or higher) in the image data of one line in the primary scanning direction, and
the halftone processing unit is configured to create the dot data so that dots are formed disproportionately towards the other timing of either forward-movement or backward-movement for the high-concentration edge pixels detected the N+1 time in the image data of one line in the primary scanning direction.

9. A printing method for printing an image by combining together dots formed by a print head at a forward-movement and a backward-movement in a common print region of a print medium, the printing method comprising
inputting image data constituting the image;
detecting pixels constituting at least a high-concentration side of an edge of the image as edge pixels based on the image data;
creating dot data expressing whether or not dots are formed based on the image data so that dots are formed disproportionately at one of the forward-movement and the backward-movement in positions on the print medium where dots corresponding to the edge pixels are formed; and
printing the image based on the dot data.

10. A non-transitory computer readable medium having stored thereon a print data creation program which is executable by a computer to create print data for printing an image with a printing device by combining dots formed by a print head at a forward-movement and a backward-movement in a common print region of a print medium, the print data creation program controls the computer to execute function of:
inputting image data constituting the image;
detecting pixels constituting at least a high-concentration side of an edge of the image as edge pixels based on the image data; and
performing halftone processing by creating dot data expressing whether or not dots are formed based on the image data so that dots are formed disproportionately at one of the forward-movement and the backward-movement in positions on the print medium where dots corresponding to the edge pixels are formed.

* * * * *